US011802776B2

United States Patent
Liu et al.

(10) Patent No.: US 11,802,776 B2
(45) Date of Patent: Oct. 31, 2023

(54) CROSS-REGIONAL TRAVEL RECOMMENDATION METHOD AND APPARATUS, ELECTRONIC DEVICE AND STORAGE MEDIUM

(71) Applicant: Beijing Baidu Netcom Science and Technology Co., Ltd., Beijing (CN)

(72) Inventors: Hao Liu, Beijing (CN); Panpan Zhang, Beijing (CN); Jianguo Duan, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 278 days.

(21) Appl. No.: 17/212,251

(22) Filed: Mar. 25, 2021

(65) Prior Publication Data

US 2021/0389148 A1    Dec. 16, 2021

(30) Foreign Application Priority Data

Jun. 11, 2020   (CN) .......................... 202010529306.1

(51) Int. Cl.
   *G01C 21/34* (2006.01)
   *G06Q 10/02* (2012.01)
   *G06Q 50/14* (2012.01)

(52) U.S. Cl.
   CPC ....... *G01C 21/3484* (2013.01); *G01C 21/343* (2013.01); *G01C 21/3423* (2013.01); *G06Q 10/02* (2013.01); *G06Q 50/14* (2013.01)

(58) Field of Classification Search
   CPC ........... G01C 21/3484; G01C 21/3423; G01C 21/343; G06Q 10/02; G06Q 50/14; G06Q 50/26; G06F 16/9537; G06K 9/6267
   See application file for complete search history.

(56) References Cited

U.S. PATENT DOCUMENTS

| | | | | |
|---|---|---|---|---|
| 5,893,081 A | * | 4/1999 | Poppen | G01C 21/3461 701/25 |
| 9,989,370 B2 | * | 6/2018 | Jackson | G01C 21/3492 |
| 10,914,600 B1 | * | 2/2021 | Spielman | G06Q 30/0284 |

(Continued)

FOREIGN PATENT DOCUMENTS

EP    3046058 A1 *  7/2016  ........... G06Q 10/025

*Primary Examiner* — Calvin Cheung
(74) *Attorney, Agent, or Firm* — Kwan & Olynick LLP (57) ABSTRACT

A cross-regional travel recommendation method and apparatus, an electronic device and a storage medium are provided, which relates to the fields of intelligent transportation and deep learning. A specific implementation solution is: acquiring a travel request of a user, the travel request comprising a start point and an end point which are located in different regions; extracting user features according to the travel request of the user; and recommending at least one travel plan to the user according to the user features and a pre-trained cross-regional travel recommendation model. The technical solutions can make up for the deficiency of the existing technology, provide a cross-regional travel plan recommendation under a large-space scale and a multimodal environment through a pre-trained cross-regional travel recommendation model and user features extracted based on a travel request of a user, and can satisfy a cross-regional travel request of the user, and is highly practical.

14 Claims, 5 Drawing Sheets

(56) References Cited

U.S. PATENT DOCUMENTS

| | | | | |
|---|---|---|---|---|
| 2014/0012498 A1* | 1/2014 | Gustafson | ........ | G01C 21/3423 |
| | | | | 701/537 |
| 2015/0345951 A1* | 12/2015 | Dutta | ............. | G01C 21/3605 |
| | | | | 701/400 |
| 2016/0203422 A1* | 7/2016 | Demarchi | ........... | G06F 16/29 |
| | | | | 705/6 |
| 2018/0211337 A1* | 7/2018 | Ghaddar | ............. | G06Q 50/14 |
| 2019/0120654 A1* | 4/2019 | Todasco | ........... | G01C 21/3667 |

* cited by examiner

CROSS-REGIONAL TRAVEL RECOMMENDATION METHOD AND APPARATUS, ELECTRONIC DEVICE AND STORAGE MEDIUM

The present application claims the priority of Chinese Patent Application No. 202010529306.1, filed on Jun. 11, 2020, with the title of "Cross-regional travel recommendation method and apparatus, electronic device and storage medium". The disclosure of the above application is incorporated herein by reference in its entirety.

FIELD OF THE DISCLOSURE

The present disclosure relates to computer technologies, particularly to the fields of intelligent transportation and deep learning, and specifically to a cross-regional travel recommendation method and apparatus, an electronic device and a storage medium.

BACKGROUND OF THE DISCLOSURE

In the existing technology, recommendation of cross-regional travel plans is faced with problems of heterogeneity and large scale. The heterogeneity is manifested in large differences in means of transportation, including planes, trains, high-speed trains, passenger cars, etc., while the large scale is manifested in wide space scale and time scale, the travel distance and the travel time being longer than those of an in-city travel trip. Due to the diversity of travel tools and differences of users' travel preferences, cross-regional travel plan recommendation is a highly complex problem. In fact, a single strategy is difficult to model preferences of different people for different travel modes in different environments, and ultimately makes incorrect recommendations.

Therefore, there is a need to provide an intelligent cross-regional travel recommendation plan.

SUMMARY OF THE DISCLOSURE

In order to solve the above problems, the present disclosure provides a cross-regional travel recommendation method and apparatus, an electronic device and a storage medium.

According to one aspect of the present disclosure, a cross-regional travel recommendation method is provided, wherein the method comprises:

acquiring a travel request of a user, the travel request comprising a start point and an end point which are located in different regions;

extracting user features according to the travel request of the user; and recommending at least one travel plan to the user according to the user features and a pre-trained cross-regional travel recommendation model.

According to another aspect of the present disclosure, a method for training a cross-regional travel recommendation model is provided, wherein the method comprises:

collecting a plurality of pieces of cross-regional travel information of a user based on a historical travel log;

extracting a plurality of pieces of training data based on the plurality of pieces of cross-regional travel information of the user; and training the cross-regional travel recommendation model by using the plurality of pieces of training data.

According to still another aspect of the present disclosure, an electronic device is provided, which comprises:

at least one processor; and a memory communicatively connected with the at least one processor;

wherein the memory stores instructions executable by the at least one processor, and the instructions are executed by the at least one processor to enable the at least one processor to perform a cross-regional travel recommendation method, wherein the method comprises:

acquiring a travel request of a user, the travel request comprising a start point and an end point which are located in different regions;

extracting user features according to the travel request of the user; and recommending at least one travel plan to the user according to the user features and a pre-trained cross-regional travel recommendation model.

According to yet another aspect of the present application, an electronic device is provided, which comprises:

at least one processor; and a memory communicatively connected with the at least one processor;

wherein the memory stores instructions executable by the at least one processor, and the instructions are executed by the at least one processor to enable the at least one processor to perform a method for training a cross-regional travel recommendation model, wherein the method comprises:

collecting a plurality of pieces of cross-regional travel information of a user based on a historical travel log;

extracting a plurality of pieces of training data based on the plurality of pieces of cross-regional travel information of the user; and training the cross-regional travel recommendation model by using the plurality of pieces of training data.

According to another aspect of the present disclosure, there is provided a non-transitory computer-readable storage medium storing computer instructions therein, wherein the computer instructions are used to cause the computer to perform a cross-regional travel recommendation method, wherein the method comprises:

acquiring a travel request of a user, the travel request comprising a start point and an end point which are located in different regions;

extracting user features according to the travel request of the user; and recommending at least one travel plan to the user according to the user features and a pre-trained cross-regional travel recommendation model.

According to still another aspect of the present disclosure, there is provided a non-transitory computer-readable storage medium storing computer instructions therein, wherein the computer instructions are used to cause the computer to perform a method for training a cross-regional travel recommendation model, wherein the method comprises:

collecting a plurality of pieces of cross-regional travel information of a user based on a historical travel log;

extracting a plurality of pieces of training data based on the plurality of pieces of cross-regional travel information of the user; and training the cross-regional travel recommendation model by using the plurality of pieces of training data.

According to still another aspect of the present disclosure, there is provided a computer program product which is stored on a non-transitory computer-readable storage medium, comprising instructions which, when the program is executed by a computer, cause the computer to perform a cross-regional travel recommendation method, wherein the method comprises:

acquiring a travel request of a user, the travel request comprising a start point and an end point which are located in different regions;

extracting user features according to the travel request of the user; and recommending at least one travel plan to the user according to the user features and a pre-trained cross-regional travel recommendation model.

The technologies according to the present disclosure can make up for the deficiency of the existing technology, provides a cross-regional travel plan recommendation under a large-space scale and a multimodal environment through a pre-trained cross-regional travel recommendation model and user features extracted based on a travel request of a user, can satisfy a cross-regional travel request of the user, and is highly practical.

It should be understood that the content described in this part is neither intended to identify key or significant features of embodiments of the present disclosure, nor intended to limit the scope of the present disclosure. Other features of the present disclosure will be readily understood through the following specification.

BRIEF DESCRIPTION OF DRAWINGS

The accompanying drawings are intended to better understand the solutions and do not limit the present disclosure. In the drawings.

DETAILED DESCRIPTION OF PREFERRED EMBODIMENTS

Exemplary embodiments of the present disclosure are described below with reference to the accompanying drawings, including various details of the embodiments of the present disclosure to facilitate understanding, and they should be considered as exemplary only. Therefore, those of ordinary skill in the art should be aware that the embodiments described here may be changed and modified in various ways without deviating from the scope and spirit of the present disclosure. Similarly, for the sake of clarity and simplicity, descriptions of well-known functions and structures are omitted in the following description.

Figure 1:
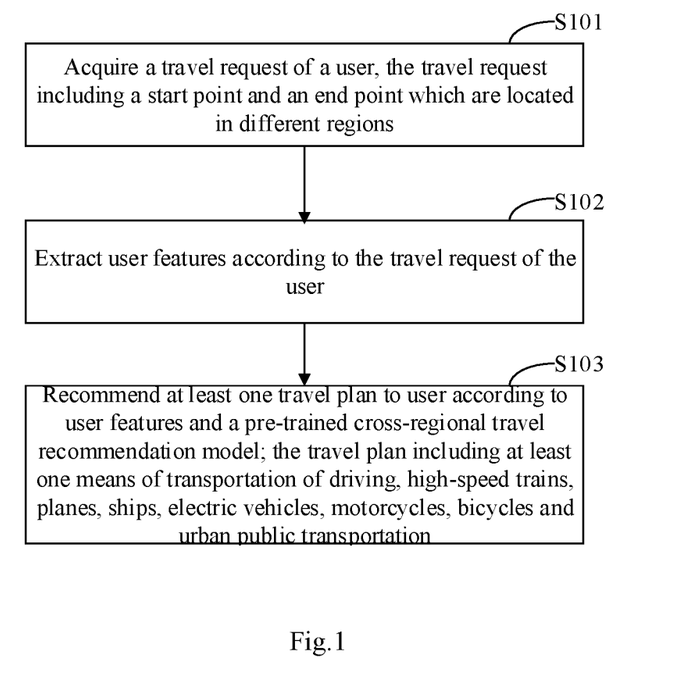
FIG. 1 is a schematic diagram according to a first embodiment of the present disclosure.

FIG. 1 is a schematic diagram according to a first embodiment of the present disclosure. As shown in FIG. 1, this embodiment provides a cross-regional travel recommendation method, which may specifically include the following steps:

S101: acquiring a travel request of a user, the travel request including a start point and an end point which are located in different regions.

The cross-regional travel recommendation method in this embodiment is performed by a cross-regional travel recommendation apparatus. The cross-regional travel recommendation apparatus may be either an electronic entity or a software-integrated application that can run on an electronic device such as a computer or a terminal.

The cross-regional travel recommendation method in this embodiment focuses on recommendation of travel plans with a large distance span and a start point and an end point being located in two different regions. For example, the "cross-regional" in this embodiment may refer to inter-city or cross regions in a very large city that are very far away and have multiple modes of transportation. The multiple modes of transportation in this embodiment may include driving, high-speed trains, planes, ships and urban public transportation, etc. That is to say, the cross-regional travel recommendation plan in this embodiment is applicable to recommendation of cross-regional travel plans with a large-space scale between a start point and an end point and multiple modes between the start point and the end point. In brief, the start point and the end point in this embodiment need to meet two characteristics: firstly, the distance has to be greater than a preset distance threshold, which may be set according to actual requirements. Secondly, means of transportation between the start point and the end point has to include multiple modes, which has certain complexity, and the travel plan cannot be planned with a single strategy.

Specifically, firstly, the travel request of the user may be received, which includes at least a start point and an end point requested by the user. Of course, a user ID also needs to be included to uniquely identify the user. In this embodiment, a travel request of a user is taken as an example, so an ID of the user is not emphasized. However, in practical applications, the cross-regional travel recommendation apparatus may process travel requests of countless users at the same time, and the corresponding user ID has to be carried in each travel request.

S102: extracting user features according to the travel request of the user.

In this embodiment, features relevant to the travel request of the user may be extracted based on the travel request of the user.

S103: recommending at least one travel plan to the user according to the user features and a pre-trained cross-regional travel recommendation model; the travel plan including at least one means of transportation of driving, high-speed trains, planes and public transportation.

For example, features of the user may be directly inputted into the pre-trained cross-regional travel recommendation model, and the cross-regional travel recommendation model may recommend at least one travel plan to the user based on the features of the user. Since the start point and the end point in the travel request of this embodiment are located in different regions, the at least one travel plan obtained may also be referred to as a cross-regional travel plan. Each cross-regional travel plan may include at least one means of transportation of driving, high-speed trains, planes, ships, electric vehicles, motorcycles, bicycles and urban public transportation. In practical applications, there is corresponding urban public transportation within each region, such as buses or subways, and there are faster modes of transportation between regions, such as high-speed trains or planes. Therefore, in general, a cross-regional travel plan may include multiple modes of modes of transportation simultaneously. It should be noted that, in consideration of requirements of users who like cycling around, the cross-regional travel plan in this embodiment may also include modes of transportation of electric vehicles, motorcycles and bicycles. That is to say, the modes of transportation of the cycling tools may form a cross-regional travel plan alone, and may also be combined with at least one another means of transportation to form a cross-regional travel plan. In addition, it should be noted that the urban public transportation in this embodiment mainly refers to public transport modes that can be adopted by users within a city. In consideration of the emergence of bike-sharing and e-bike sharing in the city and the needs of some motorcycle enthusiasts, travel plans of taking bike-sharing, e-bike sharing and motorcycle sharing as urban transportation means need to be taken into account in travel recommendation. Therefore, the urban public transportation in this embodiment may include: buses, subways, urban light rails, bicycles, electric vehicles, motorcycles, and so on.

In addition, for an existing in-city travel recommendation plan, since the start point and the end point are within a city and at a short distance and urban public transportation within a city is in a relatively single mode and can also be shared, the travel plan is relatively simple. The cross-regional travel request in this embodiment involves a large-space scale and multimodal transportation means, the existing in-city travel recommendation plan cannot recommend an effective travel plan for it.

According to the cross-regional travel recommendation method in this embodiment, a travel request of a user is acquired, the travel request including a start point and an end point which are located in different regions; user features are extracted according to the travel request of the user; and at least one travel plan is recommended to the user according to the user features and a pre-trained cross-regional travel recommendation model. The technical solution in this embodiment can make up for the deficiency of the existing technology, provides a cross-regional travel plan recommendation under a large-space scale and a multimodal environment through a pre-trained cross-regional travel recommendation model and user features extracted based on a travel request of a user, can satisfy a cross-regional travel request of the user, and is highly practical.

Figure 2:
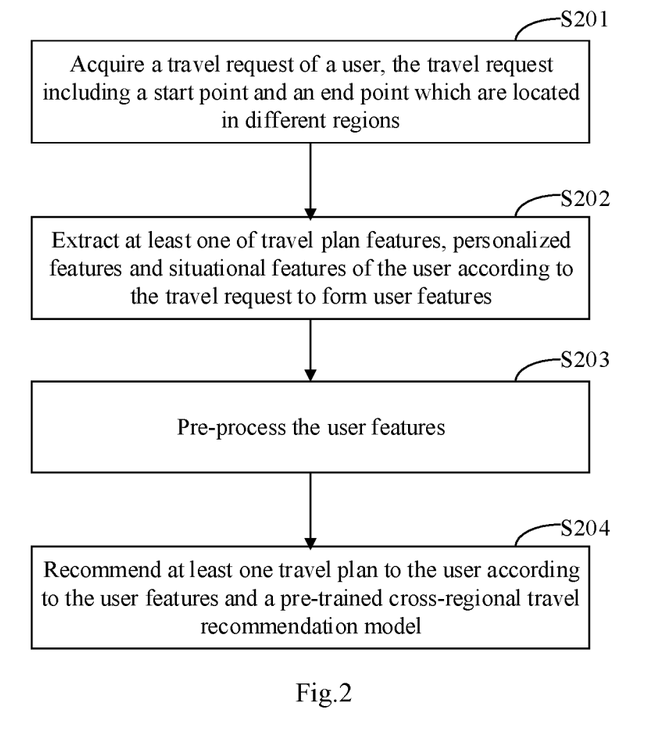
FIG. 2 is a schematic diagram according to a second embodiment of the present disclosure.

FIG. 2 is a schematic diagram according to a second embodiment of the present disclosure. Based on the technical solution in the embodiment shown in FIG. 1, the technical solution of the present disclosure is further introduced in more detail in the cross-regional travel recommendation method in this embodiment. As shown in FIG. 2, the cross-regional travel recommendation method in this embodiment may specifically include the following steps:

S201: acquiring a travel request of a user, the travel request including a start point and an end point which are located in different regions.

A specific implementation mode of the step is the same as that of step S101 in the embodiment shown in FIG. 1. Details may be obtained with reference to the above related description, and are not repeated herein.

S202: extracting at least one of travel plan features, personalized features and situational features of the user according to the travel request to form user features.

Step S202 is a specific implementation mode of step S102 in the embodiment shown in FIG. 1. Specifically, the user features may include at least one of travel plan features, personalized features and situational features of the user. Moreover, in practical applications, the more feature information included by the user features, the richer the content of the user features, the higher the accuracy of a travel recommendation plan predicted, and the more likely it is to meet the user's expectations. In practical applications, at least one of travel plan features, personalized features and situational features of the user may be selected as required to form user features.

For example, the extracting travel plan features of the user according to the travel request may specifically include the following steps:

(a) calculating a plurality of travel plans from the start point to the end point in the travel request by using an underlying routing engine; and (b) extracting at least one of an average distance, a minimum distance and a maximum distance of the at least one travel plan, at least one of an average price, a minimum price and a maximum price of the at least one travel plan, at least one of an average elapsed time, a minimum elapsed time and a maximum elapsed time of the at least one travel plan, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and performing feature expression, to form the travel plan features of the user.

Specifically, a travel request may be returned by an underlying routing engine to several cross-regional travel plans. Generally, each plan cannot be directly compared because of its heterogeneous nature. For each travel plan, some statistical features of the travel plan may be extracted and feature-enhanced to form the travel plan features of the user. In this embodiment, for example, feature overlapping involved in a difference between a distance of each travel plan and an average distance, a difference between a price of each travel plan and an average price, etc., belongs to feature enhancement. For example, for each travel plan, features corresponding to step (b) may be extracted. Features of all travel plans may be denoted as: $F_p=[F_{p1}, F_{p2}, \ldots, F_{pn}]$, where $F_{pi}$ represents features of the $i^{th}$ dimension of the travel plan p, n represents n-dimension features of each travel plan, that is, the features extracted in step (b) have n dimensions in total. A numerical representation corresponding to each feature may be directly adopted in the feature expression process of the plan.

For another example, the extracting personalized features of the user according to the travel request may specifically include: collecting at least one of gender, age, type of work, level of education, income level, consumption level and marital status of the user of the travel request, and performing feature expression, to obtain the personalized features of the user.

The personalized features of the user may be generated based on basic attribute information of the user. The basic attribute information may be extracted from all historical information of the user. For example, all historical travel information is organized as follows. The user is denoted as U, the start point is denoted as O, the end point is denoted as D, the travel time is denoted as T, and one piece of user historical travel data may be written as a quaternion Data= (U, O, D, T).

All historical travel data is processed, and a user ID is used as a unique identification to extract static portrait information of the corresponding user as the personalized features, such as gender, age, type of work, level of education, income level, consumption level and marital status. The features of this part are denoted as $F_{us}=[F_{us_1}, F_{us_2}, \ldots, F_{us_v}]$, where $F_{us_i}$ represents user portrait information of the $i^{th}$ dimension.

In consideration of the heterogeneity of users, different users may have different travel preferences. For example, users with lower income and consumption levels may prefer to travel by planes and high-speed trains compared with trains, while business people may prefer to travel by planes and high-speed trains due to travel reasons. By extracting relevant features of users, user attributes are one-hot encoded and embedded into a comparable vector space, so that similar users may have similar travel preferences.

For another example, the extracting situational features of the user according to the travel request may specifically include: collecting at least one of a total distance between the start point and the end point, a current moment, a current week, a current position, a city ID of the start point and the end point, a current province ID, a network type, a network operator category, and weather information in the travel request, and performing feature expression, to form the situational features of the user.

The start point O and the end point D in one piece of user travel data are combined as a unique identification, and portrait information of corresponding travel pairs is extracted as the situational features, which may include, for example, a total distance between the start point O and the end point D (which may be calculated from coordinates), a current moment, for example, a current hour for one-hot encoding, a current week for one-hot encoding, a current position for discrete encoding, a city ID of the start point and the end point, a current province ID, a network type, a network operator category, and so on. The features of this part are denoted as $F_{od}=[F_{od_1}, F_{od_2}, \ldots, F_{od_n}]$, where $F_{od_i}$ represents situational features of the $i^{th}$ dimension.

Similar to the heterogeneity of users, the start and end points also have strong heterogeneity. Some start and end point pairs naturally enjoy a high preference in some travel modes. For example, shorter inter-city start and end points are usually suitable for high-speed trains and passenger cars. Mapping the start and end points in a feature space enables similar start and end points to share similar travel preferences. Selections of travel plans of users in different environments usually show a great difference. By embedding a travel environment into the feature space, the model can learn about this type of impact.

S203: pre-processing the user features.

For example, it may include processing null-value, category-type and/or numerical-type features in the user features.

For example, data may be completed with a KNN method for the null-value features in the data. Specifically, for one piece of user travel data, the above three categories of features are extracted respectively and merged into a complete travel feature vector $F^t$, wherein a null-value feature is $F_i^t$, and a non-null feature is $F_{j \neq i}^t$. Cosine similarity between a non-null feature vector and other samples may be calculated. An average value or mode of the nearest K samples on the null-value attribute is taken as a default value for filling, wherein K is a hyper-parameter, and different K values may be selected according to actual situations for different features, that is, $$F_i^t = \frac{\Sigma_{m \in M} F_i^m}{K},$$

-continued $$M = topK\left(\frac{<F_{j \neq i}^t, F_{j \neq i}^m>}{\|F_{j \neq i}^t\| * \|F_{j \neq i}^m\|}\right)$$

In the above processing manner, the null-value features in the user features can be accurately and effectively filled to improve the accuracy of the user features, so as to ensure the accuracy of subsequent travel plan recommendations.

For the category-type features in the data, such as age, income level and consumption level, a value proportion of each category is calculated, and rare categories with a proportion less than 5% are aggregated and named as "others", which are then converted, through OneHot encoding, into numerical vectors that can be calculated.

For the numerical-type features in the data, first, the $N^{th}$ percentile corresponding to each feature is counted, wherein N can be set based on practical experience, such as 90, 95, 99 or other values. Values greater than the $N^{th}$ percentile are regarded as abnormal values and replaced with the value corresponding to the $N^{th}$ percentile to mitigate the impact of the abnormal values and improve the stability of the user features, thereby ensuring the stability of subsequent travel plan recommendations. Removing the abnormal values plays an extremely important role in the effect of the model. For example, if a user mistakenly inputs a pair of transnational start and end points, an unusually large total distance record may appear in training data, thus misleading the learning process of the model.

The numerical-type features can also be normalized to eliminate the impact of dimension by using a min-max normalization method, that is, $$x' = \frac{x - \min(x)}{\max(x) - \min(x)}$$

For example, for one piece of user travel data, a plan finally clicked by the user is used as truth value data, which is used as a final label of the data through OneHot encoding. A tree-based classification model is constructed, and features are screened through the distribution of feature importance output by the model, and relevant features with 0 importance are removed to reduce the time-space complexity of model training and testing.

S204: recommending at least one travel plan to the user according to the user features and a pre-trained cross-regional travel recommendation model.

Finally, the user features constructed above are inputted into the pre-trained cross-regional travel recommendation model which can output at least one travel plan and a recommendation probability of each travel plan. Then, each travel plan can be recommended to the user in order of probabilities. Similarly, the travel plan of this embodiment also includes multimodal transportation means, which may include at least one mode of driving, high-speed trains, planes, ships and urban public transportation.

According to the cross-regional travel recommendation method in this embodiment, at least one of travel plan features, personalized features and situational features of the user are extracted according to the travel request of the user, and at least one travel plan is recommended to the user according to the user features and a pre-trained cross-regional travel recommendation model. The user features constructed in this embodiment include at least one of travel plan features, personalized features and situational features of the user. The construction of the user features is rich in content and reasonable in information, which can effectively describe feature information of the travel request of the user from various perspectives, and then accurately and effectively recommend at least one travel plan to the user based on the user features. Based on the above, the technical solution of this embodiment comprehensively takes the diversity of transportation means, the diversity of travel scenes in space and time and the dynamic nature of users' travel preferences into account, which can effectively guarantee the effect and stability of recommendations.

Figure 3:
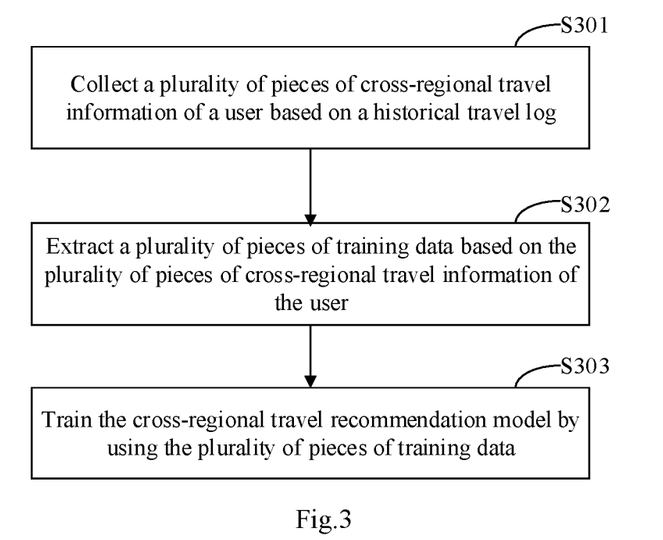
FIG. 3 is a schematic diagram according to a third embodiment of the present disclosure.

FIG. 3 is a schematic diagram according to a third embodiment of the present disclosure. As shown in FIG. 3, this embodiment provides a method for training a cross-regional travel recommendation model, which may specifically include the following steps:

S301: collecting a plurality of pieces of cross-regional travel information of a user based on a historical travel log;

S302: extracting a plurality of pieces of training data based on the plurality of pieces of cross-regional travel information of the user; and S303: training the cross-regional travel recommendation model by using the plurality of pieces of training data.

The method for training a cross-regional travel recommendation model in this embodiment may be performed by an apparatus for training a cross-regional travel recommendation model. The apparatus may be either an electronic entity or a software-integrated application that runs on a computer device in use to train a to-be-trained cross-regional travel recommendation model.

In this embodiment, massive user travel data can be calculated based on historical travel logs and a plurality of pieces of cross-regional travel information of a user is collected. Then, based on the plurality of pieces of cross-regional travel information of the user, a plurality of pieces of training data is extracted. For example, optionally, each piece of training data may include user features extracted based on the cross-regional travel information of the user and a travel plan selected by the user. In use, a recommendation probability of the travel plan is marked as 1; correspondingly, a recommendation probability of other travel plans may be 0. The user features extracted based on the cross-regional travel information of the user may specifically include: at least one of corresponding travel plan features, personalized features and situational features of the user extracted. Specifically, it can be constructed according to the manner of extracting the user features in the embodiment shown in FIG. 2. A plurality of pieces of training data can be constructed according to the above manner.

Finally, the cross-regional travel recommendation model is trained by using the plurality of pieces of training data. For example, in the training, a cross-entropy loss function can be taken as an objective function of the model, a stochastic gradient descent (SGD) is taken as an optimization method for the model, and optimal parameters of the model can be found by grid search and cross-validation. A multi-category cross-regional travel recommendation model similar to an xgboost classifier is trained, which may be denoted as f. The classifier is persisted for online service invocation.

In an online prediction stage, for a user travel demand, features are obtained through interfaces of the features, which construct a feature vector F together. The trained xgboost classifier is used to score, and a score vector f(F) of different travel plans is outputted. The plan with the highest score is considered as an optimal travel plan under a current situation. The recommendation probability of each travel plan may be expressed as:

$$p = \operatorname*{argmax}_{p} f(F).$$

Further optionally, before step S303 of training the cross-regional travel recommendation model by using the plurality of pieces of training data, the method may further include pre-processing the user features in each piece of training data, which may include, for example, processing null-value, category-type and/or numerical-type features in the user features. Details may be obtained with reference to the description of step S203 in the embodiment shown in FIG. 2, and are not repeated herein.

It should be noted that, in this embodiment, the type of feature information included in the user features required in the use of the cross-regional travel recommendation model has to be consistent with that of feature information included in the user features required in the training. If situational features are not included in the training, the situational features cannot be included in the use. In the training, a starting moment is included in the situational features, so it is necessary to include the starting moment in the situational features in use.

According to the method for training a cross-regional travel recommendation model in this embodiment, a plurality of pieces of cross-regional travel information of a user is collected based on a historical travel log; a plurality of pieces of training data is extracted based on the plurality of pieces of cross-regional travel information of the user; and the cross-regional travel recommendation model is trained by using the plurality of pieces of training data. A plurality of pieces of training data corresponding to cross-regional travel information of a user can be collected based on a historical travel log, and the cross-regional travel recommendation model is trained based on the training data, so that the cross-regional travel recommendation model can learn travel plans of historical cross-regional travel information, so as to more accurately recommend a travel plan.

Further optionally, in this embodiment, each piece of training data extracted may include user features extracted based on the cross-regional travel information of the user and a travel plan selected by the user. The user features extracted based on the cross-regional travel information of the user may specifically include: at least one of corresponding travel plan features, personalized features and situational features of the user extracted based on the cross-regional travel information of the user. Thus, feature types of the user features included in the training data constructed in this embodiment can be very rich, which enables the cross-regional travel recommendation model to fully learn the influences of various historical travel information on the travel plan, and then enables the recommendation of the trained cross-regional travel recommendation model to be very accurate.

Figure 4:
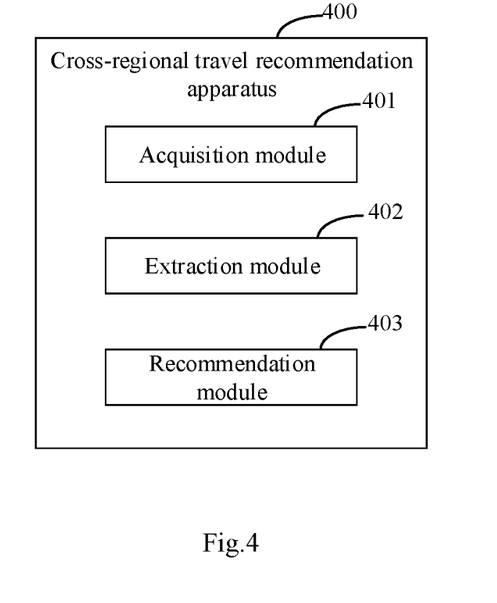
FIG. 4 is a schematic diagram according to a fourth embodiment of the present disclosure.

FIG. 4 is a schematic diagram according to a fourth embodiment of the present disclosure. As shown in FIG. 4, this embodiment provides a cross-regional travel recommendation apparatus 400, including:

an acquisition model 401 configured to acquire a travel request of a user, the travel request including a start point and an end point which are located in different regions;

an extraction model 402 configured to extract user features according to the travel request of the user; and a recommendation module 403 configured to recommend at least one travel plan to the user according to the user features and a pre-trained cross-regional travel recommendation model.

According to the cross-regional travel recommendation apparatus 400 in this embodiment, the implementation principle and technical effect of cross-regional travel recommendation achieved by using the above modules are the same as those achieved in the related method embodiment. Details may be obtained with reference to the description in the related method embodiment and are not repeated herein.

Figure 5:
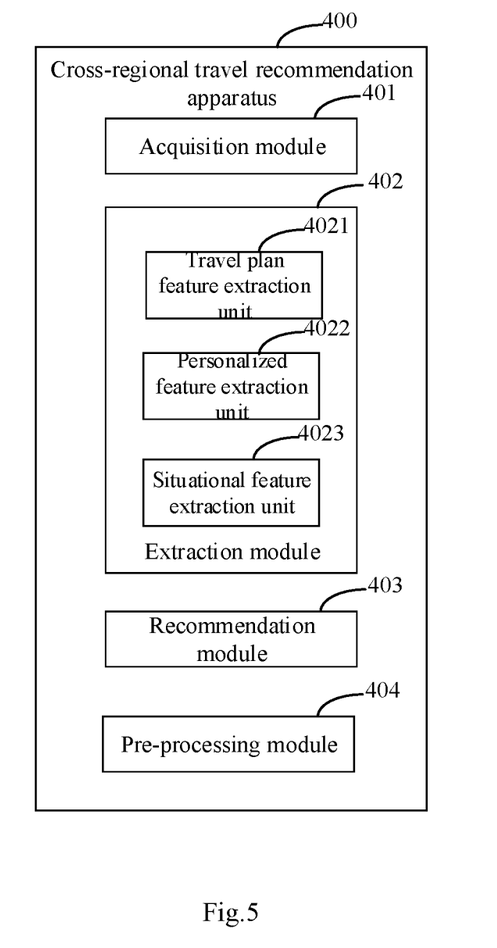
FIG. 5 is a schematic diagram according to a fifth embodiment of the present disclosure.

FIG. 5 is a schematic diagram according to a fifth embodiment of the present disclosure. As shown in FIG. 5, based on the technical solution in the embodiment shown in FIG. 4, the technical solution of the present disclosure is further introduced in more detail in the cross-regional travel recommendation apparatus 400 in this embodiment.

The travel plan in this embodiment includes at least one means of transportation of driving, high-speed trains, planes, ships, electric vehicles, motorcycles, bicycles and urban public transportation.

As shown in FIG. 5, in the cross-regional travel recommendation apparatus 400 in this embodiment, the extraction module 402 includes at least one of the following units:

a travel plan feature extraction unit 4021 configured to extract travel plan features of the user according to the travel request;

a personalized feature extraction unit 4022 configured to extract personalized features of the user according to the travel request; and a situational feature extraction unit 4023 configured to extract situational features of the user according to the travel request.

As shown in FIG. 5, in this embodiment, for example, the extraction module 402 includes the above three units at the same time, and at least one of them can be included in practical applications.

Further optionally, the travel plan feature extraction unit 4021 is configured to:

calculate a plurality of travel plans from the start point to the end point in the travel request by using an underlying routing engine; and extract at least one of an average distance, a minimum distance and a maximum distance of the at least one travel plan, at least one of an average price, a minimum price and a maximum price of the at least one travel plan, at least one of an average elapsed time, a minimum elapsed time and a maximum elapsed time of the at least one travel plan, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and perform feature expression, to form the travel plan features of the user.

Further optionally, the personalized feature extraction unit 4022 is configured to:

collect at least one of gender, age, type of work, level of education, income level, consumption level and marital status of the user of the travel request, and perform feature expression, to obtain the personalized features of the user.

Further optionally, the situational feature extraction unit 4023 is configured to:

collect at least one of a total distance between the start point and the end point, a current moment, a current week, a current position, a city ID of the start point and the end point, a current province ID, a network type, a network operator category, and weather information in the travel request, and perform feature expression, to form the situational features of the user.

Further optionally, as shown in FIG. 5, the cross-regional travel recommendation apparatus 400 in this embodiment further includes:

a pre-processing module 404 configured to pre-process the user features; and further, the pre-processing module 404 is specifically configured to:

process null-value, category-type and/or numerical-type features in the user features.

According to the cross-regional travel recommendation apparatus 400 in this embodiment, the implementation principle and technical effect of cross-regional travel recommendation achieved by using the above modules are the same as those achieved in the related method embodiment. Details may be obtained with reference to the description in the related method embodiment and are not repeated herein.

Figure 6:
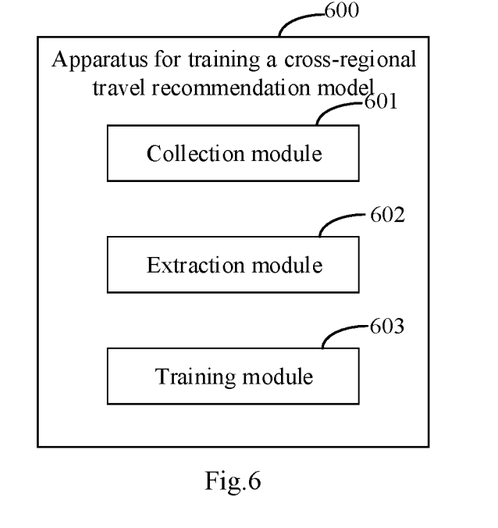
FIG. 6 is a schematic diagram according to a sixth embodiment of the present disclosure.

FIG. 6 is a schematic diagram according to a sixth embodiment of the present disclosure. As shown in FIG. 6, this embodiment provides an apparatus 600 for training a cross-regional travel recommendation model, including:

a collection module 601 configured to collect a plurality of pieces of cross-regional travel information of a user based on a historical travel log;

an extraction module 602 configured to extract a plurality of pieces of training data based on the plurality of pieces of cross-regional travel information of the user; and a training module 603 configured to train the cross-regional travel recommendation model by using the plurality of pieces of training data.

According to the apparatus 600 for training a cross-regional travel recommendation model in this embodiment, the implementation principle and technical effect of training of a cross-regional travel recommendation model achieved by using the above modules are the same as those achieved in the related method embodiment. Details may be obtained with reference to the description in the related method embodiment and are not repeated herein.

Further optionally, the extraction module 602 is specifically configured to:

extract corresponding user features based on each of the plurality of pieces of cross-regional travel information of the user; and mark probabilities of corresponding travel plans as 1 to form the training data; and obtain the plurality of pieces of training data in total.

Further optionally, the extraction module 602 is specifically configured to:

extract at least one of corresponding travel plan features, personalized features and situational features of the user according to each of the plurality of pieces of cross-regional travel information of the user.

According to the apparatus 600 for training a cross-regional travel recommendation model in this embodiment, the implementation principle and technical effect of training of a cross-regional travel recommendation model achieved by using the above modules are the same as those achieved in the related method embodiment. Details may be obtained with reference to the description in the related method embodiment and are not repeated herein.

According to an embodiment of the present disclosure, the present disclosure further provides an electronic device and a readable storage medium.

Figure 7:
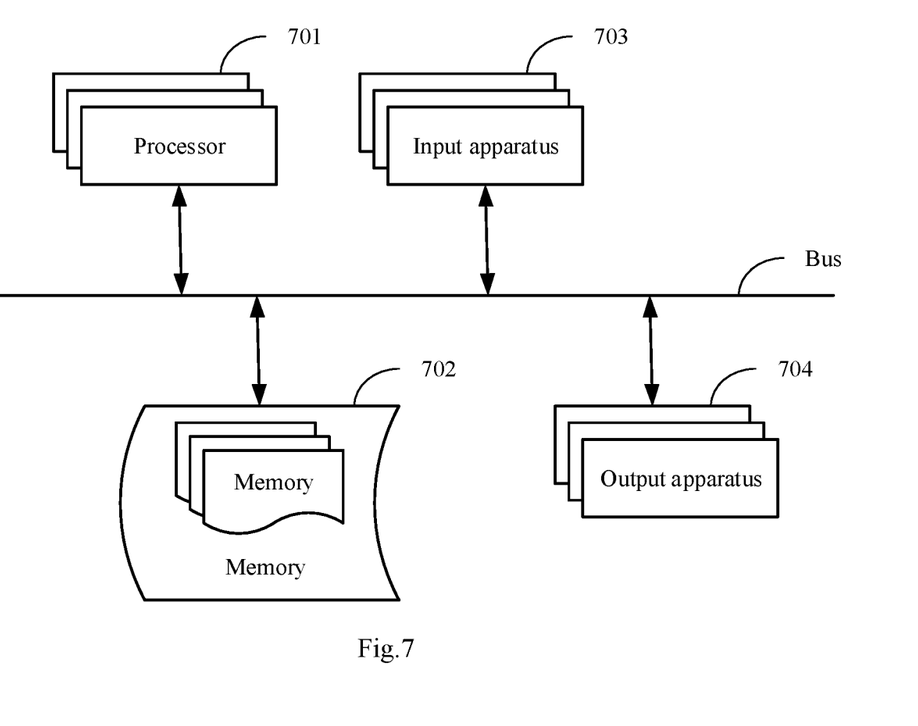
FIG. 7 is a block diagram of an electronic device configured to implement the method according to the embodiment of the present disclosure.

As shown in FIG. 7, it is a block diagram of an electronic device for implementing the above methods according to an embodiment of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the electronic device includes: one or more processors 701, a memory 702, and interfaces for connecting various components, including high-speed and low-speed interfaces. The components are connected to each other by using different buses and may be mounted on a common motherboard or otherwise as required. The processor may process instructions executed in the electronic device, including instructions stored in the memory or on the memory to display graphical information of a GUI on an external input/output apparatus (such as a display device coupled to the interfaces). In other implementation modes, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 701 is taken as an example is FIG. 7.

The memory 702 is the non-instantaneous computer-readable storage medium provided in the present disclosure. The memory stores instructions executable by at least one processor to make the at least one processor perform the cross-regional travel recommendation method or the method for training a cross-regional travel recommendation model provided in the present disclosure. The non-instantaneous computer-readable storage medium in the present disclosure stores computer instructions. The computer instructions are used to make a computer perform the cross-regional travel recommendation method or the method for training a cross-regional travel recommendation model provided in the present disclosure.

The memory 702, as a non-instantaneous computer-readable storage medium, may be configured to store non-instantaneous software programs, non-instantaneous computer executable programs and modules, for example, program instructions/modules (e.g. the related modules shown in FIG. 4, FIG. 5 and FIG. 6) corresponding to the cross-regional travel recommendation method or the method for training a cross-regional travel recommendation model provided in the present disclosure. The processor 701 runs the non-instantaneous software programs, instructions and modules stored in the memory 702 to execute various functional applications and data processing of a server, that is, to implement the cross-regional travel recommendation method or the method for training a cross-regional travel recommendation model in the above method embodiments.

The memory 702 may include a program storage area and a data storage area. The program storage area may store an operating system and an application required by at least one function; and the data storage area may store data created according to use of the electronic device for implementing the cross-regional travel recommendation method or the method for training a cross-regional travel recommendation model. In addition, the memory 702 may include a high-speed random access memory, and may further include a non-instantaneous memory, for example, at least one disk storage device, a flash memory device, or other non-instantaneous solid-state storage devices. In some embodiments, the memory 702 optionally includes memories remotely disposed relative to the processor 701. The remote memories may be connected to the electronic device for implementing the cross-regional travel recommendation method or the method for training a cross-regional travel recommendation model over a network. Examples of the network include, but are not limited to, the Internet, intranets, local area networks, mobile communication networks and combinations thereof.

The electronic device for implementing the cross-regional travel recommendation method or the method for training a cross-regional travel recommendation model may further include: an input apparatus 703 and an output apparatus 704. The processor 701, the memory 702, the input apparatus 703 and the output apparatus 704 may be connected through a bus or in other manners. In FIG. 7, the connection through a bus is taken as an example.

The input apparatus 703 may receive input numerical information or character information, and generate key signal input related to user setting and function control of the electronic device for implementing the cross-regional travel recommendation method or the method for training a cross-regional travel recommendation model, for example, input apparatuses such as a touch screen, a keypad, a mouse, a trackpad, a touch pad, a pointer, one or more mouse buttons, a trackball, and a joystick. The output apparatus 704 may include a display device, an auxiliary lighting device (e.g., an LED) and a tactile feedback device (e.g., a vibration motor). The display device may include, but is not limited to, a liquid crystal display (LCD), a light-emitting diode (LED) display and a plasma display. In some implementation modes, the display device may be a touch screen.

Various implementation modes of the systems and technologies described here can be implemented in a digital electronic circuit system, an integrated circuit system, an ASIC (application-specific integrated circuit), computer hardware, firmware, software, and/or combinations thereof. The various implementation modes may include: being implemented in one or more computer programs, wherein the one or more computer programs may be executed and/or interpreted on a programmable system including at least one programmable processor, and the programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a CRT (cathode-ray tube) or an LCD (liquid crystal display) monitor) for displaying information to the user; and a keyboard and pointing device (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described here can be implemented in a computing system including background components (for example, as a data server), or a computing system including middleware components (for example, an application server), or a computing system including front-end components (for example, a user computer with a graphical user interface or webpage browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also referred to as a cloud computing server or cloud host. It is a host product in the cloud computing service system to solve the defects of great management difficulty and weak business expansibility in traditional physical host and VPS services.

According to the technical solutions in the embodiments of the present disclosure, a travel request of a user is acquired, the travel request including a start point and an end point which are located in different regions; user features are extracted according to the travel request of the user; and at least one travel plan is recommended to the user according to the user features and a pre-trained cross-regional travel recommendation model. The travel plan includes at least one means of transportation of driving, high-speed trains, planes, ships, electric vehicles, motorcycles, bicycles and urban public transportation. The technical solutions in the embodiments of the present disclosure can make up for the deficiency of the existing technology, provides a cross-regional travel plan recommendation under a large-space scale and a multimodal environment through a pre-trained cross-regional travel recommendation model and user features extracted based on a travel request of a user, can satisfy a cross-regional travel request of the user, and is highly practical.

According to the technical solutions in the embodiments of the present disclosure, at least one of travel plan features, personalized features and situational features of the user are extracted according to the travel request of the user to form user features, and at least one travel plan is recommended to the user according to the user features and a pre-trained cross-regional travel recommendation model. The user features constructed in the embodiments of the present disclosure include at least one of travel plan features, personalized features and situational features of the user. The construction of the user features is rich in content and reasonable in information, which can effectively describe feature information of the travel request of the user from various perspectives, and then accurately and effectively recommend at least one travel plan to the user based on the user features. Based on the above, the technical solutions in the embodiments of the present disclosure comprehensively take the diversity of transportation means, the diversity of travel scenes in space and time and the dynamic nature of users' travel preferences into account, which can effectively guarantee the effect and stability of recommendations.

It should be understood that the steps can be reordered, added, or deleted by using the various forms of processes shown above. For example, the steps described in the present disclosure may be executed in parallel or sequentially or in different sequences, provided that the desired results of the technical solutions disclosed in the present disclosure can be achieved, which are not limited herein.

The above specific implementation modes do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A computer-implemented cross-regional travel recommendation method, wherein the method comprises:
    acquiring, by a terminal device a travel request of a user, the travel request comprising a start point and an end point which are located in different regions, wherein a distance between the start point and the end point is greater than a preset distance threshold and multiple modes of transportation means are available between the start point and the end point;
    extracting user features according to the travel request of the user; and
    recommending, by the terminal device, at least one travel plan to the user according to the user features and a pre-trained cross-regional travel recommendation model,
    wherein the extracting user features according to the travel request of the user comprises:
    extracting at least one of travel plan features, personalized features and situational features of the user according to the travel request,
    and/or the travel plan comprises at least one means of transportation of driving, high-speed trains, planes, ships, electric vehicles, motorcycles, bicycles and urban public transportation,
    wherein the extracting travel plan features of the user according to the travel request comprises:
    calculating a plurality of travel plans from the start point to the end point in the travel request by using an underlying routing engine; and
    extracting at least one of an average distance, a minimum distance and a maximum distance of all the plurality of travel plans, at least one of an average price, a minimum price and a maximum price of all the plurality of travel plans, at least one of an average elapsed time, a minimum elapsed time and a maximum elapsed time of all the plurality of travel plans, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and performing feature enhancing on the extracted features, to form the travel plan features of the user.

2. The method according to claim 1, wherein the extracting personalized features of the user according to the travel request comprises:
collecting at least one of gender, age, type of work, level of education, income level, consumption level and marital status of the user of the travel request, and performing feature enhancing on the extracted features, to obtain the personalized features of the user.

3. The method according to claim 2, wherein after the extracting user features according to the travel request and before the recommending at least one travel plan to the user according to the user features and a pre-trained cross-regional travel recommendation model, the method further comprises:
processing null-value, category-type and/or numerical-type features in the user features.

4. The method according to claim 1, wherein the extracting situational features of the user according to the travel request comprises:
collecting at least one of a total distance between the start point and the end point, a current moment, a current weak, a current position, a city ID of the start point and the end point, a current province ID, a network type, a network operator category, and weather information in the travel request, and performing feature enhancing on the extracted features, to form the situational features of the user.

5. The method according to claim 4, wherein after the extracting user features according to the travel request and before the recommending at least one travel plan to the user according to the user features and a pre-trained cross-regional travel recommendation model, the method further comprises:
processing null-value, category-type and/or numerical-type features in the user features.

6. The method according to claim 1, wherein after the extracting user features according to the travel request and before the recommending at least one travel plan to the user according to the user features and a pre-trained cross-regional travel recommendation model, the method further comprises:
processing null-value, category-type and/or numerical-type features in the user features.

7. The method according to claim 1, wherein after the extracting user features according to the travel request and before the recommending at least one travel plan to the user according to the user features and a pre-trained cross-regional travel recommendation model, the method further comprises:
processing null-value, category-type and/or numerical-type features in the user features.

8. The method according to claim 1, wherein after the extracting user features according to the travel request and before the recommending at least one travel plan to the user according to the user features and a pre-trained cross-regional travel recommendation model, the method further comprises:
processing null-value, category-type and/or numerical-type features in the user features.

9. A computer-implemented method for training a cross-regional travel recommendation model, wherein the method comprises:
collecting a plurality of pieces of cross-regional travel information of a user from a software-integrated application running on a terminal device based on a historical travel log, the cross-regional travel information comprising travel request of the user having a start point and an end point which are located in different regions, wherein a distance between the start point and the end point is greater than a preset distance threshold and multiple modes of transportation means are available between the start point and the end point;
extracting a plurality of pieces of training data based on the plurality of pieces of cross-regional travel information of the user; and
training the cross-regional travel recommendation model by using the plurality of pieces of training data wherein the extracting a plurality of pieces of training data based on the plurality of pieces of cross-regional travel information of the user comprises:
extracting corresponding user features based on each of the plurality of pieces of cross-regional travel information of the user; and marking probabilities of corresponding travel plans as 1 to form the training data; and obtaining the plurality of pieces of training data in total,
wherein the extracting corresponding user features based on each of the plurality of pieces of cross-regional travel information of the user comprises:
extracting at least one of corresponding travel plan features, personalized features and situational features of the user according to each of the plurality of pieces of cross-regional travel information of the user.

10. An electronic device, comprising:
at least one processor; and
a memory communicatively connected with the at least one processor;
wherein the memory stores instructions executable by the at least one processor, and the instructions are executed by the at least one processor to enable the at least one processor to perform a cross-regional travel recommendation method, wherein the method comprises:
acquiring, by a terminal device, a travel request of a user, the travel request comprising a start point and an end point which are located in different regions, wherein a distance between the start point and the end point is greater than a preset distance threshold and multiple modes of transportation means are available between the start point and the end point;
extracting user features according to the travel request of the user; and
recommending-, by the terminal device, at least one travel plan to the user according to the user features and a pre-trained cross-regional travel recommendation model wherein the extracting user features according to the travel request of the user comprises:

extracting at least one of travel plan features, personalized features and situational features of the user according to the travel request, and/or the travel plan comprises at least one means of transportation of driving, high-speed trains, planes, ships, electric vehicles, motorcycles, bicycles and urban public transportation, wherein the extracting travel plan features of the user according to the travel request comprises:

calculating a plurality of travel plans from the start point to the end point in the travel request by using an underlying routing engine; and extracting at least one of an average distance, a minimum distance and a maximum distance of all the plurality of travel plans, at least one of an average price, a minimum price and a maximum price of all the plurality of travel plans, at least one of an average elapsed time, a minimum elapsed time and a maximum elapsed time of all the plurality of travel plans, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and performing feature enhancing on the extracted features, to form the travel plan features of the user.

11. The electronic device according to claim 10, wherein the extracting personalized features of the user according to the travel request comprises:

collecting at least one of gender, age, type of work, level of education, income level, consumption level and marital status of the user of the travel request, and performing feature enhancing on the extracted features, to obtain the personalized features of the user.

12. The electronic device according to claim 10, wherein the extracting situational features of the user according to the travel request comprises:

collecting at least one of a total distance between the start point and the end point, a current moment, a current weak, a current position, a city ID of the start point and the end point, a current province ID, a network type, a network operator category, and weather information in the travel request, and performing feature enhancing on the extracted features, to form the situational features of the user.

13. A non-transitory computer-readable storage medium storing computer instructions therein, wherein the computer instructions are used to cause a computer to perform a cross-regional travel recommendation method, wherein the method comprises:

acquiring, by a terminal device a travel request of a user, the travel request comprising a start point and an end point which are located in different regions, wherein a distance between the start point and the end point is greater than a preset distance threshold and multiple modes of transportation means are available between the start point and the end point;

extracting user features according to the travel request of the user; and recommending by the terminal device, at least one travel plan to the user according to the user features and a pre-trained cross-regional travel recommendation model, wherein the extracting user features according to the travel request of the user comprises:

extracting at least one of travel plan features, personalized features and situational features of the user according to the travel request, and/or the travel plan comprises at least one means of transportation of driving, high-speed trains, planes, ships, electric vehicles, motorcycles, bicycles and urban public transportation, wherein the extracting travel plan features of the user according to the travel request comprises:

calculating a plurality of travel plans from the start point to the end point in the travel request by using an underlying routing engine; and extracting at least one of an average distance, a minimum distance and a maximum distance of all the plurality of travel plans, at least one of an average price, a minimum price and a maximum price of all the plurality of travel plans, at least one of an average elapsed time, a minimum elapsed time and a maximum elapsed time of all the plurality of travel plans, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and performing feature enhancing on the extracted features, to form the travel plan features of the user.

14. A computer program product which is stored on a non-transitory computer-readable storage medium, comprising instructions which, when the program is executed by a computer, cause the computer to perform a cross-regional travel recommendation method, wherein the method comprises:

acquiring, by a terminal device a travel request of a user, the travel request comprising a start point and an end point which are located in different regions, wherein a distance between the start point and the end point is greater than a preset distance threshold and multiple modes of transportation means are available between the start point and the end point;

extracting user features according to the travel request of the user; and recommending by the terminal device, at least one travel plan to the user according to the user features and a pre-trained cross-regional travel recommendation model, wherein the extracting user features according to the travel request of the user comprises:

extracting at least one of travel plan features, personalized features and situational features of the user according to the travel request, and/or the travel plan comprises at least one means of transportation of driving, high-speed trains, planes, ships, electric vehicles, motorcycles, bicycles and urban public transportation, wherein the extracting travel plan features of the user according to the travel request comprises:

calculating a plurality of travel plans from the start point to the end point in the travel request by using an underlying routing engine; and extracting at least one of an average distance, a minimum distance and a maximum distance of all the plurality of travel plans, at least one of an average price, a minimum price and a maximum price of all the plurality of travel plans, at least one of an average elapsed time, a minimum elapsed time and a maximum elapsed time of all the plurality of travel plans, at least one of a difference between a distance of each travel plan and the average distance, a difference between the distance and the minimum distance and a difference between the distance and the maximum distance, at least one of a difference between a price of each travel plan and the average price, a difference between the price and the minimum price and a difference between the price and the maximum price, and at least one of a difference between an elapsed time of each travel plan and the average elapsed time, a difference between the elapsed time and the minimum elapsed time and a difference between the elapsed time and the maximum elapsed time, and performing feature enhancing on the extracted features, to form the travel plan features of the user.

\* \* \* \* \*